(12) United States Patent
Gesicki et al.

(10) Patent No.: US 9,095,866 B2
(45) Date of Patent: Aug. 4, 2015

(54) METHOD AND APPARATUS FOR APPLICATION OF MORTAR

(75) Inventors: Scott Gesicki, Broomfield, CO (US);
Amir Hoda, Broomfield, CO (US);
Jerald Shelsta, Broomfield, CO (US)

(73) Assignee: INLAND PIPE REHABILITATION LLC, The Woodlands, TX (US)

( * ) Notice: Subject to any disclaimer, the term of this patent is extended or adjusted under 35 U.S.C. 154(b) by 664 days.

(21) Appl. No.: 13/367,298

(22) Filed: Feb. 6, 2012

(65) Prior Publication Data
US 2012/0199668 A1   Aug. 9, 2012

Related U.S. Application Data

(60) Provisional application No. 61/440,527, filed on Feb. 8, 2011, provisional application No. 61/447,303, filed on Feb. 28, 2011.

(51) Int. Cl.
| | |
|---|---|
| *A01C 17/00* | (2006.01) |
| *B05B 13/06* | (2006.01) |
| *B05B 3/10* | (2006.01) |
| *B05B 7/14* | (2006.01) |
| *F16L 58/06* | (2006.01) |

(52) U.S. Cl.
CPC ............ *B05B 13/0636* (2013.01); *B05B 3/1007* (2013.01); *B05B 7/1481* (2013.01); *F16L 58/06* (2013.01)

(58) Field of Classification Search
CPC ........ A01C 17/00; A01C 17/001; A01C 3/06; E01C 19/203; B05B 1/02; B05B 1/265; B05B 1/34; B05B 1/28; B05B 1/18; B05B 1/267

USPC ......... 239/461, 499, 504, 505, 518, 147, 172, 239/650, 659, 665, 667, 681, 684, 687, 722, 239/176
See application file for complete search history.

(56) References Cited

U.S. PATENT DOCUMENTS

| | | | |
|---|---|---|---|
| 2,168,917 A | * | 8/1939 | Perkins ........................ 118/708 |
| 2,461,517 A | | 2/1949 | Carnevale |
| 2,670,991 A | | 3/1954 | Perkins |
| 2,800,875 A | | 7/1957 | Jewell |
| 2,879,003 A | | 3/1959 | Finn |
| 2,922,583 A | | 1/1960 | Perkins |

(Continued)

FOREIGN PATENT DOCUMENTS

| | | |
|---|---|---|
| DE | 19823398 A1 | 12/1999 |
| EP | 1351009 A1 | 10/2003 |

(Continued)

OTHER PUBLICATIONS

International Search Report for Application No. PCT/US2012/024204, dated May 18, 2012.

*Primary Examiner* — Justin Jonaitis
(74) *Attorney, Agent, or Firm* — Marshall, Gerstein & Borun LLP

(57) ABSTRACT

An apparatus for applying mortar is provided. The apparatus includes a support sled and a mixer positioned on the support sled. The mixer combines a received dry powder mortar and a liquid, and a pump positioned on the support sled and adapted to pump the mixed mortar and liquid. The apparatus further includes a spray head positioned on the support sled and adapted to receive the pumped mortar and liquid mixture and spray the mixture.

20 Claims, 14 Drawing Sheets

(56) References Cited

U.S. PATENT DOCUMENTS

| | | | |
|---|---|---|---|
| 2,935,777 A | 5/1960 | Perkins et al. | |
| 3,012,757 A | 12/1961 | Marzolf | |
| 3,022,765 A | 2/1962 | Xenis | |
| 3,120,346 A | 2/1964 | Willhoite | |
| 3,121,533 A | 2/1964 | Sedlacsik | |
| 3,159,895 A | 12/1964 | Perovich | |
| 3,525,111 A | 8/1970 | Arx | |
| 3,606,862 A | 9/1971 | Huff et al. | |
| 3,696,576 A | 10/1972 | De Barros | |
| 3,810,441 A | 5/1974 | Padgett et al. | |
| 3,887,133 A | 6/1975 | Straarup et al. | |
| 4,023,502 A | 5/1977 | Elsing | |
| 4,148,465 A | 4/1979 | Bowman | |
| 4,252,763 A | 2/1981 | Padgett | |
| 4,329,937 A | 5/1982 | Holland | |
| RE30,963 E | 6/1982 | Moller et al. | |
| 4,337,723 A | 7/1982 | Davis | |
| 4,401,696 A * | 8/1983 | Wood | 427/236 |
| 4,414,918 A | 11/1983 | Nelson Holland et al. | |
| 4,440,499 A * | 4/1984 | Tomikawa et al. | 366/3 |
| 4,493,593 A | 1/1985 | Schlimbach | |
| 4,684,065 A | 8/1987 | Svarrer | |
| 4,938,167 A | 7/1990 | Mizuho et al. | |
| 5,056,715 A | 10/1991 | Korsmeyer | |
| 5,181,962 A | 1/1993 | Hart | |
| 5,246,641 A | 9/1993 | Perkins et al. | |
| 5,294,059 A | 3/1994 | Willan | |
| 5,409,561 A | 4/1995 | Wood | |
| 5,443,377 A | 8/1995 | Perkins et al. | |
| 5,650,103 A | 7/1997 | Perkins et al. | |
| 5,656,117 A | 8/1997 | Wood et al. | |
| 5,788,159 A * | 8/1998 | Pischek | 239/227 |
| 6,209,852 B1 | 4/2001 | George et al. | |
| 6,227,813 B1 | 5/2001 | Leimer | |
| 6,427,726 B1 | 8/2002 | Kiest, Jr. | |
| 6,632,475 B1 | 10/2003 | Bleggi | |
| 6,699,324 B1 | 3/2004 | Berdin et al. | |
| 6,986,813 B2 | 1/2006 | Davis | |
| 7,275,733 B2 | 10/2007 | Svitavsky et al. | |
| 7,338,687 B2 * | 3/2008 | Davis | 427/236 |
| 7,591,901 B1 * | 9/2009 | Weisenberg | 118/306 |
| 7,682,655 B1 | 3/2010 | Weisenberg | |
| 7,726,256 B1 | 6/2010 | Weisenberg | |
| 7,866,277 B1 | 1/2011 | Weisenberg | |
| 7,867,558 B1 | 1/2011 | Weisenberg | |
| 8,079,569 B2 | 12/2011 | Lesko | |
| 2007/0181061 A1 | 8/2007 | Whittle | |
| 2009/0000259 A1 | 1/2009 | Grieve | |
| 2011/0097486 A1 | 4/2011 | Weisenberg | |
| 2011/0244125 A1 | 10/2011 | Weisenberg et al. | |
| 2012/0199062 A1 | 8/2012 | Gesicki et al. | |
| 2012/0199668 A1 | 8/2012 | Gesicki et al. | |
| 2012/0199669 A1 | 8/2012 | Gesicki et al. | |
| 2012/0280064 A1 | 11/2012 | Jedneak | |

FOREIGN PATENT DOCUMENTS

| | | |
|---|---|---|
| EP | 2258974 A2 | 12/2010 |
| EP | 2258974 A3 | 5/2013 |
| WO | WO-2004112972 A1 | 12/2004 |
| WO | WO-2012/109287 A1 | 8/2012 |
| WO | WO-2012/109288 A1 | 8/2012 |
| WO | WO-2012/109289 A1 | 8/2012 |
| WO | WO-2012/109290 A2 | 8/2012 |

* cited by examiner

METHOD AND APPARATUS FOR APPLICATION OF MORTAR

CROSS-REFERENCE TO RELATED APPLICATIONS

This application claims the benefit of U.S. Provisional Patent Application Ser. Nos. 61/440,527, filed Feb. 8, 2011 to Scott Gesicki et al., titled "Method and Apparatus for Application of Mortar", and 61/447,303, filed Feb. 28, 2011 to Scott Gesicki et al, titled "Method and Apparatus for Application of Mortar", the entire contents of these applications being incorporated herein by reference.

FIELD OF THE INVENTION

The present invention relates to the application of mortar, and more specifically to the application of a mortar formed of cementatious materials or polymer or other mortar in a spray on application, preferably employing inventive centrifugal spinner equipment and accompanying inventive delivery equipment.

BACKGROUND OF THE INVENTION

Application of mortar or other rehabilitation materials on the inside of concrete or metal pipes, other concrete or other surfaces to be remediated often takes too much time, the equipment is too expensive, and current processes fail to provide a satisfactory product. Similar issues may present themselves when such pipe is formed of corrugated metal or other metal pipes, or any other pipe surface. The issues may range from full structural failure, partial structural failure, cracks, exfiltration of materials from the pipe, infiltration of materials into the pipe, separation of joints, etc.

FIG. 13 depicts a typical spinner head assembly. As is shown in FIG. 13, a nozzle 700 spins about an axis 710, comprising a hose or other material delivery device. Upon delivery of material at a high speed, such material is preferably ejected at a high velocity from spinning head 720, including rear spinner disc 714, thus generating a material discharge point 712. Further shown is an air intake 730 and a spinner body 740. The air is used to spin the spinner head in a pneumatic fashion. The spinner head is preferably attached to a sled to position the spinner head at the correct point in the pipe. The sled also controls the movement of the spinner head parallel to the pipe. Such a system fails to provide a high velocity material discharge system, thus resulting in potentially uneven application of material, Therefore, it would be desirable to provide an apparatus that overcomes the drawbacks of the prior art.

SUMMARY OF THE INVENTION

In accordance with one or more embodiments of the present invention, one or more inventive apparatuses and methods are preferably provided for properly positioning a spinner head in a location in which mortar is to be deployed, and for delivering various materials to the spinner head, for placement of the spinner head in a desired location, and for use of an inventive spray head with the inventive spinner head. An inventive apparatus in accordance with an embodiment of the invention may comprise an inventive centrifugal spinner for application of rehabilitation material in a pipe, other remediation area, or the like to a desired placement point or application area. Sprayers of any other sort may also be applicable in accordance with one or more alternative embodiments of the invention.

In accordance with another embodiment of the invention, a method may be provided in which a layered or laminated spray of rehabilitation material may be provided, thus allowing for a single application of any desired thickness, and preferably from ¼" or less to as much 6" inches thick or more in some circumstances.

In accordance with another embodiment of the invention, an inventive method for transporting equipment utilized for application of rehabilitation material through a pipe or other confined space in a manner that monitors and meters appropriate application volumes may be provided. Mixers for mixing various materials may be provided in the vicinity of a spinner head applying the material, and may further be position on an inventive sled used for supporting the mixer and spray head.

In yet another embodiment of the invention, a method for safely conveying, power, and supplying air, electric, raw rehabilitation material, water and other material to an application point through a specially designed harness that encapsulates and protects the components of such a delivery system may be provided.

In accordance with a further embodiment of the invention, an inventive centrifugal spinner is preferably provided that may allow for the introduction of high volume, high pressure air and/or other materials at a discharge point, which in turn allows the rehabilitation material to be projected or propelled at a high velocity. This high velocity material may be projected or propelled in a manner that achieves a high impact of the rehabilitation material on a desired surface, thus resulting in a desired packing of the material thereon. In turn, the rehabilitation material preferably achieves a high density at its point of application, positively affecting rehabilitation material (i.e. mortar) performance and durability. This durability and performance increase may include one or more of an improved resistance to chemical attack, an improvement of general imperviousness of the applied material, an improvement in the compressive strengths of the material, and achievement of a greater diameter placement.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The invention will now be described making reference to the following drawings in which like reference numbers denote like structure or steps. In accordance with various embodiments of the invention, an inventive mortar may be applied in accordance with an inventive application method, employing an inventive application apparatus in order to address failures in pipes or other substances where access may be limited. Such inventive methods and systems may employ mixing of mortar material outside of a remediation area, delivery of one or more components thereof to be mixed in the vicinity of the remediation area, and preferred final placement of mortar material to an area in which there is limited or confined space access. The thoroughly mixed material may then preferably be applied through a high speed centrifugal sprayer or nozzle apparatus in a manner that produces a thick to thin overlaying fully compacted, consolidated composite.

The inventors of the present invention have suggested two ways to address the delivery of material to a confined space with limited access, as described above. Such application may take place through the use of an inventive dry delivery process in which material is forwarded and mixed in the vicinity of the remediation area, or through the use of an inventive wet delivery process in which material is mixed outside the remediation area, and then forwarded to the remediation area. Each of these processes will now be described.

Mortar Dry Delivery Process

Figure 1:
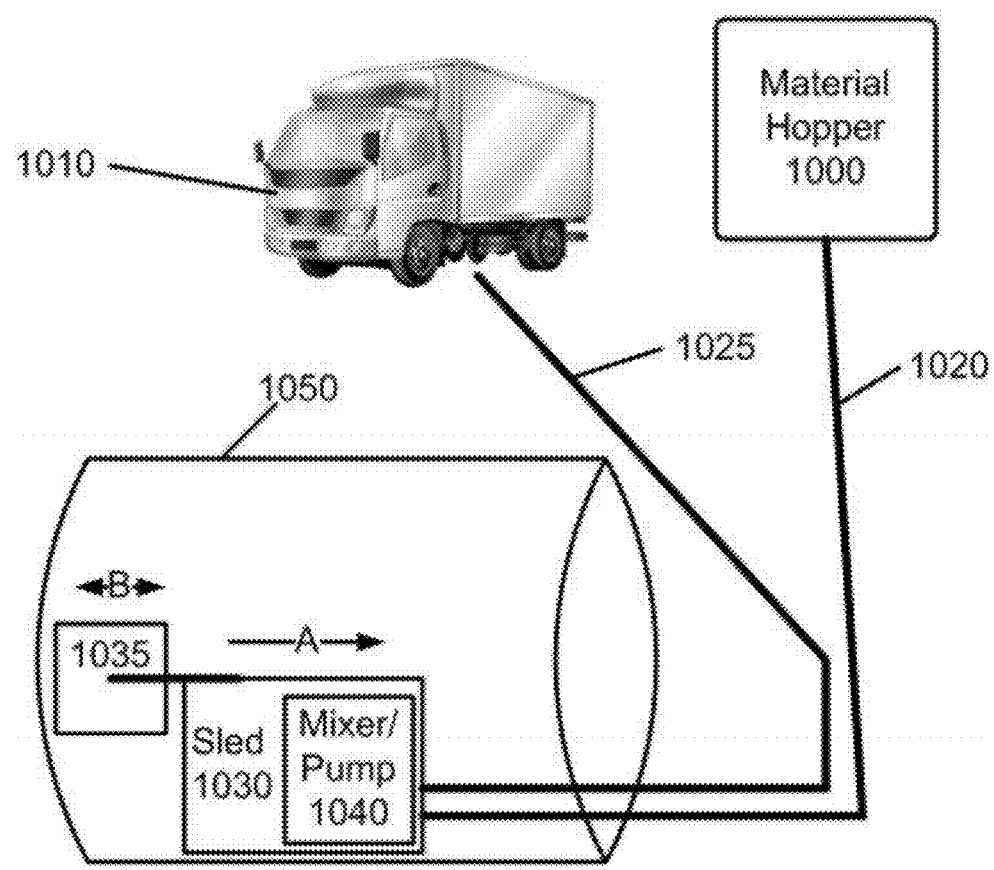
FIG. 1 is a block diagram of an inventive mortar dry delivery application process in accordance with an embodiment of the invention.

Referring first to FIG. 1, a system for performing the inventive mortar dry delivery application process is shown. Dry powder and other material required for application of rehabilitation material is preferably stored in a material hopper 1000. While only one material hopper is displayed, it should be understood that multiple material hoppers or other holding mechanisms may be employed to hold larger amounts of material, or to hold different materials that are not yet to be mixed together. Also shown in a support truck 1010 (or other support mechanism, i.e. train, etc.). The support truck preferably provides cranes and other mechanical assistance as may be necessary, and further (as will be described below) preferably operates a harness employed to properly position a spraying mechanism. As noted, any type of support mechanism may be employed that provides sufficient mechanical and other support (electrical, etc.).

As is further shown in FIG. 1, material hopper 1000 may be coupled with a material supply line 1020 for providing material from material hopper 1000 to a sled 1030. Support truck 1010 may be further coupled to a harness 1025, preferably including at least a means for moving sled 1030, such as a chain, cable or the like. Harness 1025 may also include water, air and other materials to be delivered to sled 1030.

Sled 1030 is further preferably formed with a mixer/pump mechanism 1040 and a spray head 1035. Sled 1030 is also preferably formed with support means for supporting the sled within a remediation area 1050 such as a pipe or the like. Sled 1030 is therefore preferably formed with one more skis or the like for easily traversing many materials, such as corrugated metal, concrete, cracked or damaged materials, or even previous layers of remediation materials if multiple layers are to be applied. Wheels or other means of support and allowance of motion of the sled may also be provided.

During operation, sled 1030 is preferably placed at a location within remediation area 1050 in which remediation is to begin. Such remediation area typically may comprise a start of a section of pipe or the like. Support truck preferably pulls sled 1030 in the direction indicated by arrow A at a predetermined rate of speed in accordance with the desired thickness of rehabilitation material to be deposited along remediation area 1050. While moving, a spray head 1035 is preferably oscillated in the directions indicated by arrow B, thus providing a feathering effect of the rehabilitation material within remediation area 1050.

Mixer/pump 1040 provides for the mixing of dry rehabilitation material from material hopper 1000 (or of other dry or wet materials from other material hoppers), along with air, water and the like from harness 1025, other air or water intake mechanisms, or from any other available source. As will be described below, use of such an inventive mixing-pump and sled combination allows for the deployment of one or more inventive spray heads in accordance with embodiments of the present invention.

Figure 2:
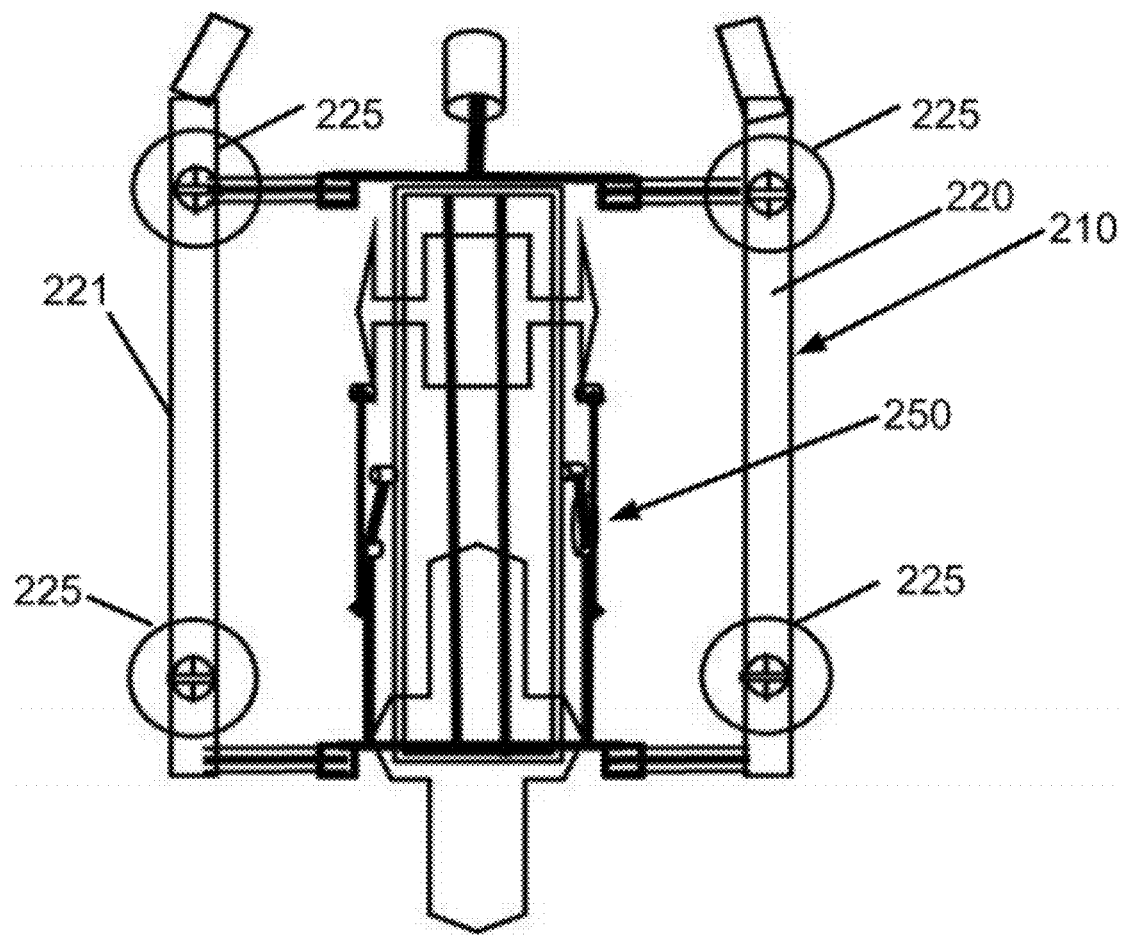
FIG. 2 is a small sled support mechanism constructed in accordance with an embodiment of the invention.
Figure 3:
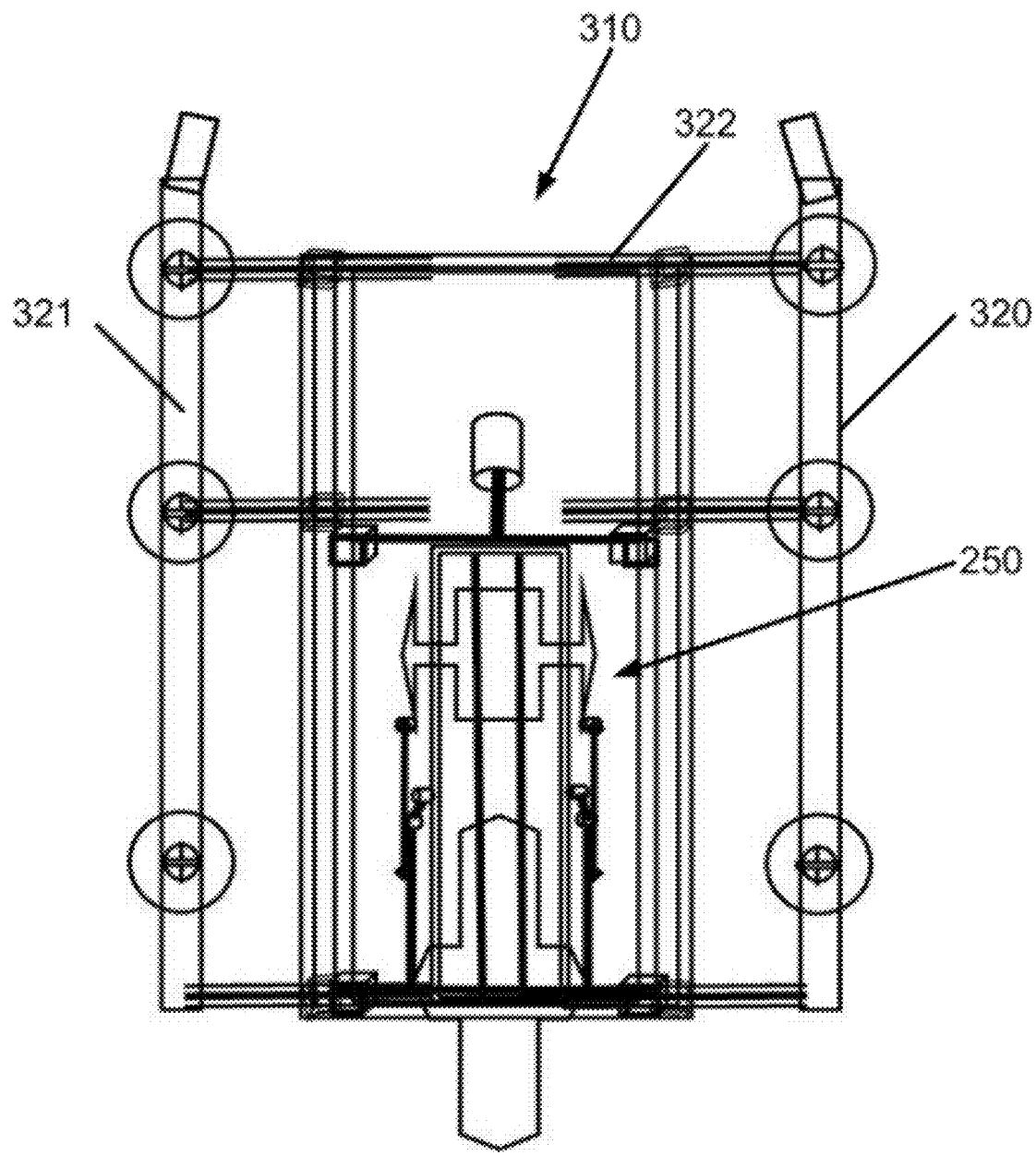
FIG. 3 is a large sled support mechanism in accordance with an embodiment of the invention.
Figure 4:
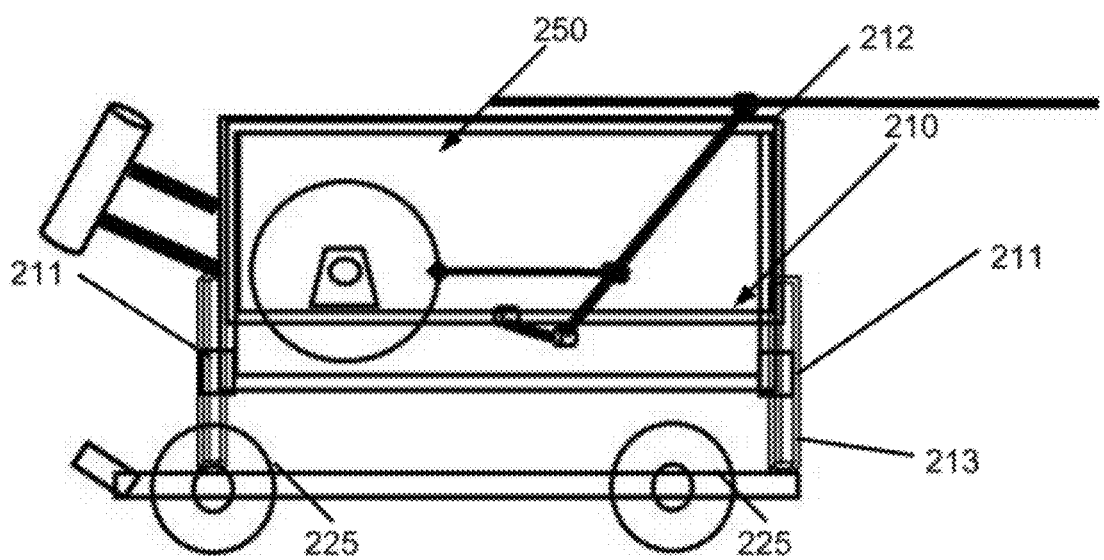
FIG. 4 is a plan view of the sled support mechanism of FIG. 2.

Referring next to FIG. 2, an inventive sled in accordance with an embodiment of the invention is shown. As is show in FIG. 2, a sled is preferably formed of a support system 210 and a mortar handling system 250. Support system 210 is further formed of one or more support frame pieces 220, 221 (among other support frame pieces) and wheels 225 for supporting support frame pieces 220 221, and allowing for movement through a remediation area, such as a pipe or the like. As noted above, skis, feet, or other support points allowing for movement of the sled relative to the remediation area may further be employed. FIG. 3 depicts a larger sled, including a larger support system 310, employing support frame pieces 320, 321, as well as internal frame portions 322, allowing for the positioning of mortar handling system 250 nearer to a center position (radially) with respect to a larger remediation area or pipe, or in any other desired location. FIG. 4 depicts a side plan view of the smaller sled of FIG. 2, while FIG. 4 depicts a side plan view of the larger sled of FIG. 3.

Figure 5:
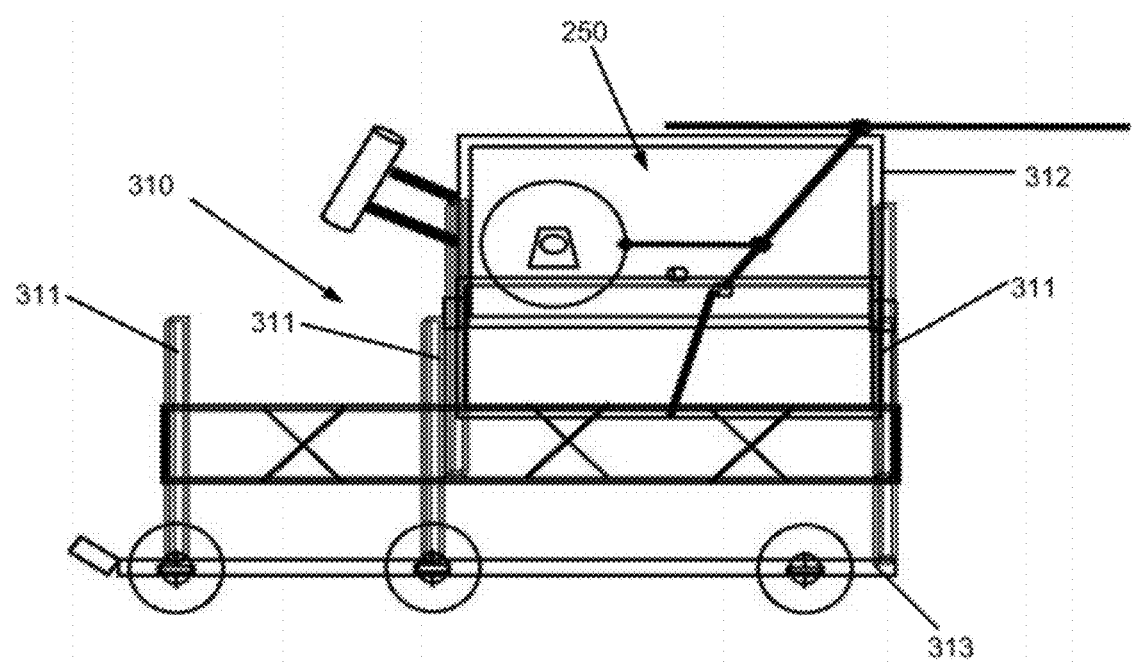
FIG. 5 is a plan view of the sled support mechanism of FIG. 3.

As is shown in each of FIGS. 2-5, each support system is adapted to preferentially position mortar handling system 250 at a desired location of the remediation area, and is therefore provided with one or more height adjustment features as part of the support frame. Thus, as is shown in FIG. 4, support frame 210 may further comprise height adjustment elements 211 to position upper support frame 212 relative to lower support frame 213. Additionally, as is shown in FIG. 5, support frame 210 may further comprise height adjustment elements 211 to position upper support frame 212 relative to lower support frame 213. Additionally, support frames 210 and 310 are preferably able to be broken down to provide access to a remediation area that may be difficult to reach, and then reassembled once in the proper, desired location.

Figure 6:
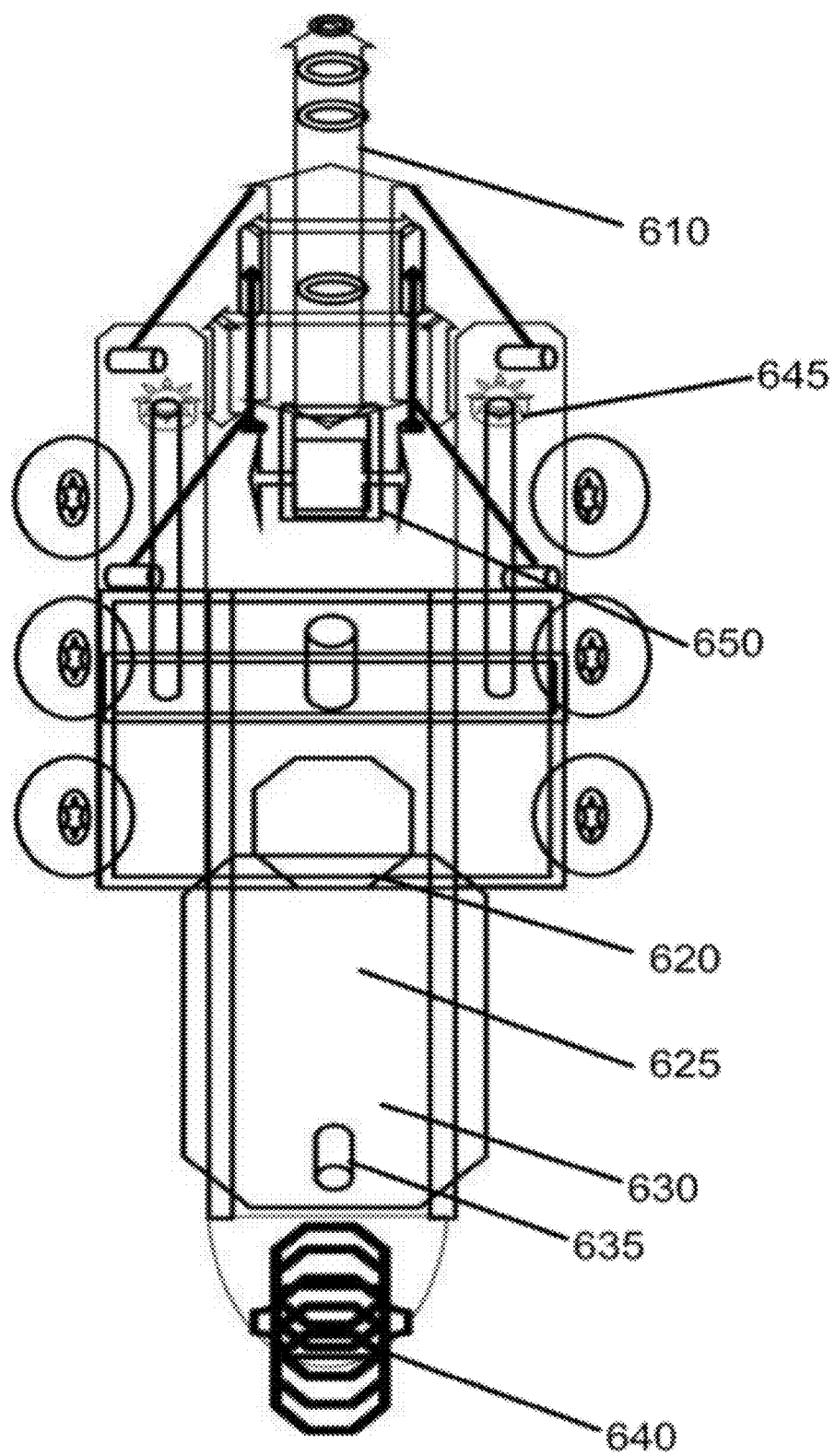
FIG. 6 is a dry mortar delivery apparatus constructed in accordance with an embodiment of the invention.

Referring next to FIG. 6 a dry delivery apparatus and process will be described. As is shown in FIG. 6, mortar handling system 250 may further comprise a spinner head 610 located at or near the beginning of a discharge point of mortar handling system 250. A pump 620 is preferably positioned adjacent spinner head 610, and is adapted to provide dry mortar material thereto. A mixer 625 is positioned to provide material to pump 620. Each of the pump and mixer comprise a portion of the mortar handling system 250, and are similarly therefore supported by support frames 210, 310. Mixer 625 may comprise a mixing element for combining material, and may further comprise a high shear compact mixer. A feeder 630 or material surge hopper/feeder is preferably positioned inline within the remediation area, such as a pipe or confined space cavity, and is preferably linked to mixer 625 for providing material thereto. A harness connection 635 may then be provided, thus connecting and delivering dry mortar, and preferably supplies one or more of air, water, power, and raw dry material to the equipment. A guide/drive wheel 640 may be provided for guiding a direction of the sled, and for aiding in driving the sled.

Dry raw material mortar is then preferably conveyed through harness 635 to feeder 630. Feeder 630 in turn preferably conveys the dry material mortar to mixer 625; the mixer mixes any such received material with water and perhaps one or more other materials to be mixed therewith (as will be described in greater detail below) and then pumps, via pump 620, the material through a discharge spray mechanism, such as spinner 610.

The dry mortar material may be provided as a powder comprising rehabilitation material or the like may be delivered to a jobsite or other application location in small 25 lb to 100 lb breakable bags, 500 lb to 3000 lb bulk super sacks, or in bulk pneumatic tankers. Other methods of delivery may also be employed.

The following exemplary material and devices may preferably be employed in accordance with application of one or more of the exemplary various embodiments of the invention, although any other combination of elements may be employed:

Large volume air compressor with a minimum output of 100 C.F.M, but any desired compressor may be employed Large generator capable of minimum 220 v output, or any other power amount may be employed.

Water storage tank and pump capable of supplying adequate water for pre-washing of application area and batch water for material. Minimum 500 gallon, or any necessary amount.

Material storage bin or hopper with attached blower capable of receiving and pneumatically delivering the dry bulk material to the Feeder.

A crane or winch capable of lifting all equipment in and out of confined space as well as loading and unloading bag and super sack raw materials.

A current commercially available spinner head may be employed to discharge and direct a thick to thin spray or application coating of rehabilitation material (such as that shown in FIG. 7), including a proprietary blend of GeoSpray™ and GeoSpray™ AMS geopolymer mortars. In accordance with the invention, however, it is desirable to apply a ¼" inch or less to 6 inch thick or greater coating in a single complete pass, without any hand trowel or finishing required, to a surface to be rehabilitated, such as to the inside of a concrete pipe, metal pipe, or the like. There are preferably three sizes of spinner heads currently available, including a 1", 1½", and 2" inline feed, although the invention shall not be so limited and may be employed with any sized spray head. These exemplary spinner heads may be employed as follows:

1" spray 12" to 102" diameter pipe
1½" spray 30" to 144" diameter pipe
2" Spray 42" to 180" diameter pipe While there are a variety of conventional spinner shafts and heads available, none of these spinner heads have been found to be capable of achieving a desired "Thick to Thin" spray configuration desired to build the thicknesses desired, in accordance with the various embodiments of the present invention. Therefore, in accordance with one or more embodiments of the invention, one or more inventive modified spinner heads may be provided. Such a modified orifice or spinner head may comprise one or more trapezoidal openings in a spinning cylinder that delivers rehabilitation material in a manner which thickly applies a larger volume of material then overlays the thicker volume with a thinner finer spray as the spinner head is moved back through the pipe or confined space.

Figure 7:
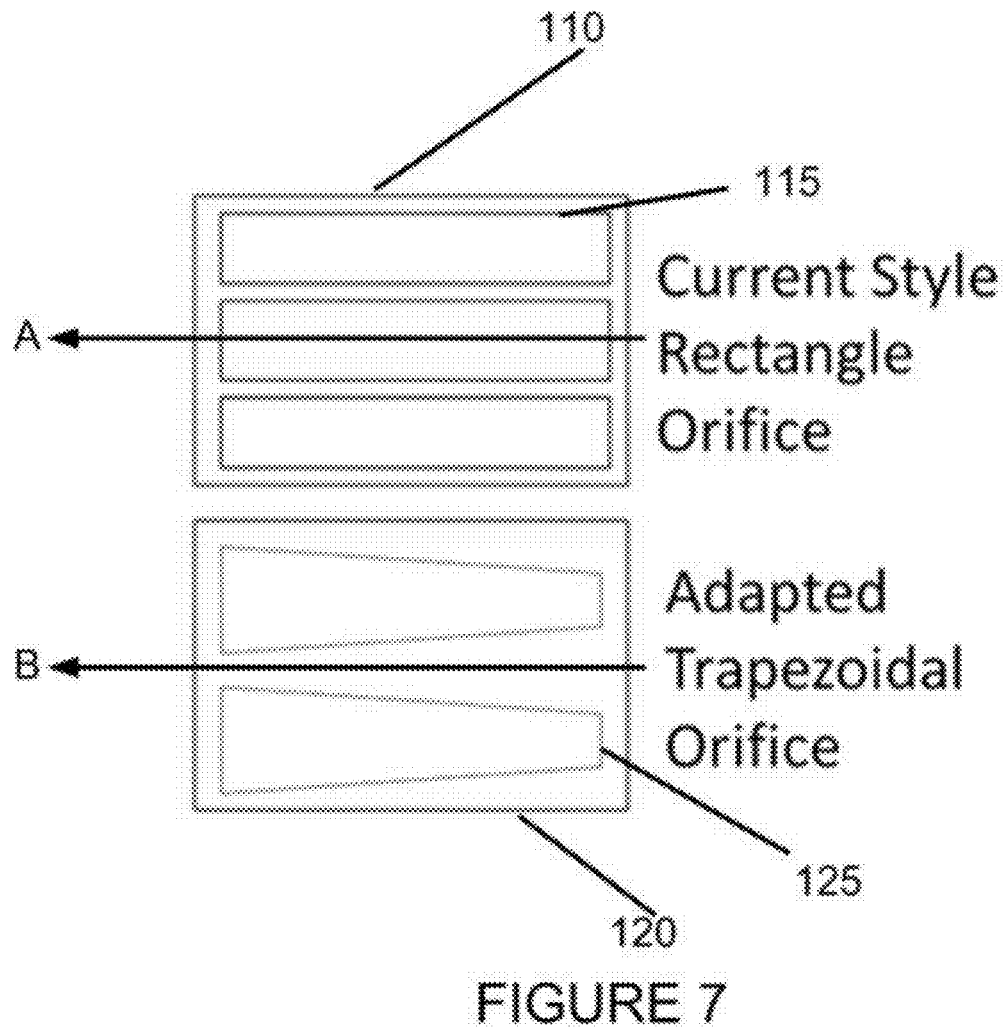
FIG. 7 is a depiction of a mortar application head constructed in accordance with an embodiment of the invention.

Referring first to FIG. 7, a spinner head 120 employing trapezoidal orifices 125 is shown, and compared to a conventional spinner head 110 employing rectangular orifices 115. As is shown in FIG. 7, conventional spinner head 110 is mounted in such a manner as to rotate about an axis, denoted at "Arrow A." As rotated in such a manner, mortar or other material may be expelled from the one or more rectangular orifices 115. As is evident from FIG. 1, material will be evenly provided to a surface, such as the inside of a pipe to which the mortar is to be applied from the one or more rectangular orifices 115. As such a conventional spinner head is moved back and forth in the direction indicated by Arrow A (or opposite the direction indicated by Arrow A), material will be evenly and continuously applied. The inventors of the present invention have determined, however, that it may be advantageous to first apply a heavier layer of mortar material, followed by a thinner, finer layer of such mortar material. Thus, the use of the inventive spinner head 120 employing trapezoidal orifices 125 may preferably apply a varying thickness of mortar or other material. Such trapezoidal orifice shapes allow for the above-noted thinner layer of material upon removal of the spinner head from the pipe or other application surface through movement in the direction indicated by Arrow B. As the orifices move back and for the in the direction indicated by Arrow B (or opposite the direction indicated by Arrow B), and eventually around a central support point, such as a material supply pipe or the like (as will be described below), trapezoidal orifices 125 allow for control of the amount of material applied to different surfaces. Upon removal of the inventive spinner head 120 from such a pipe or the like, the thinnest portions of trapezoidal orifices 125 will spray material into the pipe last at each point therein, thus providing a finer, thinner application of mortar on top of any thicker layer of mortar or other material.

Figure 8:
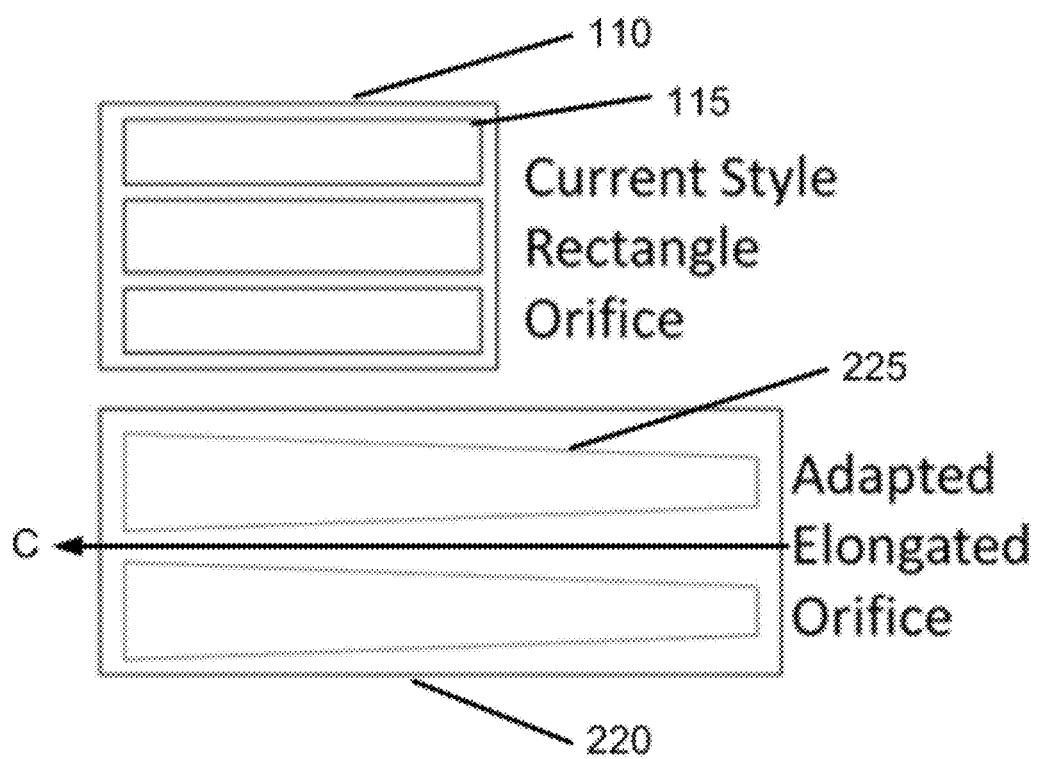
FIG. 8 is a depiction of an alternative mortar application head constructed in accordance with an alternative embodiment of the invention.

FIG. 8 shows a similar inventive spinner head 220 including elongated trapezoidal orifices 225, and once again as compared to a conventional spray head 110. Such elongation creates a larger spray zone, thus enabling the delivery of material to be fanned out further gaining greater coverage, while providing the benefits of the embodiment described above with respect to FIG. 7. Such an extended spinner head will preferably allow for a sustained build up of material as the spinner head is moved back through the pipe or confined space in the direction indicted by "Arrow C" (and upon rotation about an axis indicated thereby) while still allowing for the application of a thinner, finer layer of mortar material when desired.

Figure 9:
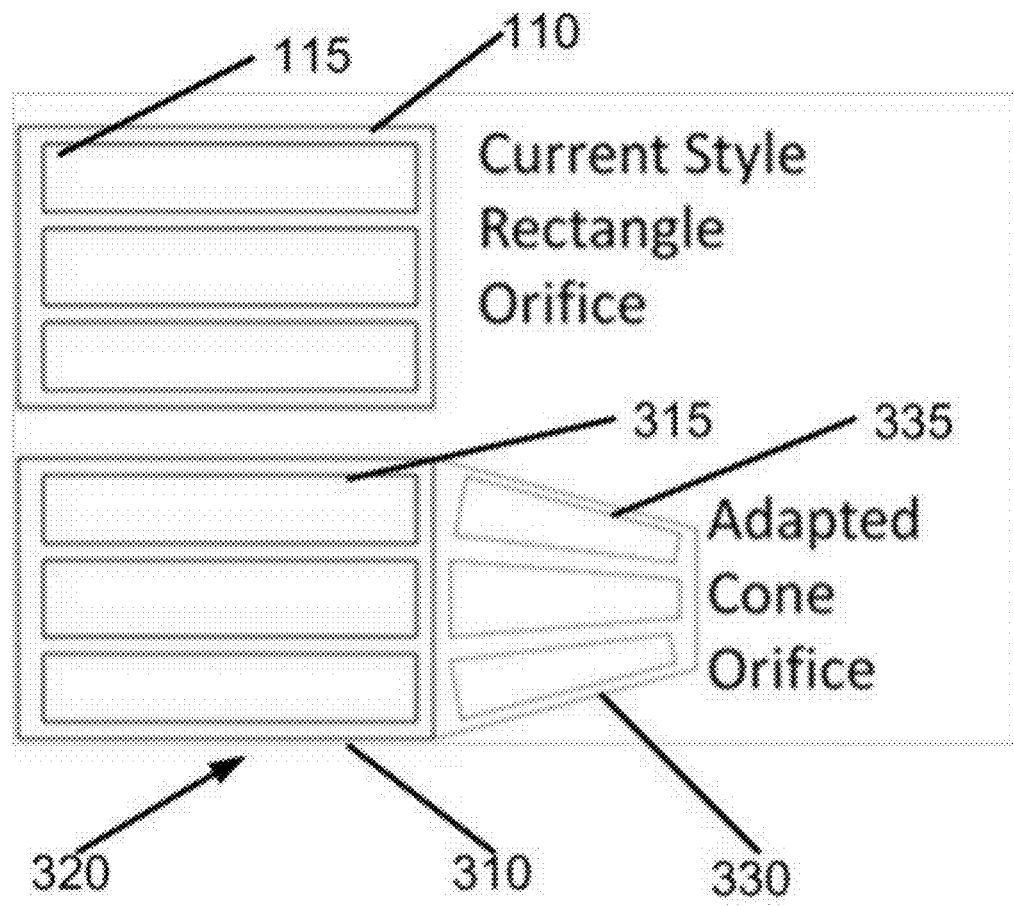
FIG. 9 is a depiction of yet another alternative mortar application head constructed in accordance with another alternative embodiment of the invention.

FIG. 9 shows an alternative embodiment of an inventive spinner head 320 including a conventional portion 310 including conventional rectangular orifices 315, and a conical section portion 330 including trapezoidal orifices 335 (or alternatively, rectangular, triangular, or other desirably-shaped orifices positioned along the conical portion 330). The use of such a spinner head allows for the even, bulk application of mortar material as in the conventional spinner head 110, and further allows for the benefits of the use of trapezoidal orifices in order to provide a thinner, finer application of mortar upon the removal of the sprayer head. In such a manner a benefit in the type and consistency of mortar applied may be provided, thus providing a thinner application adjacent the cone end (335) of the spinner head spinner top.

Figure 10:
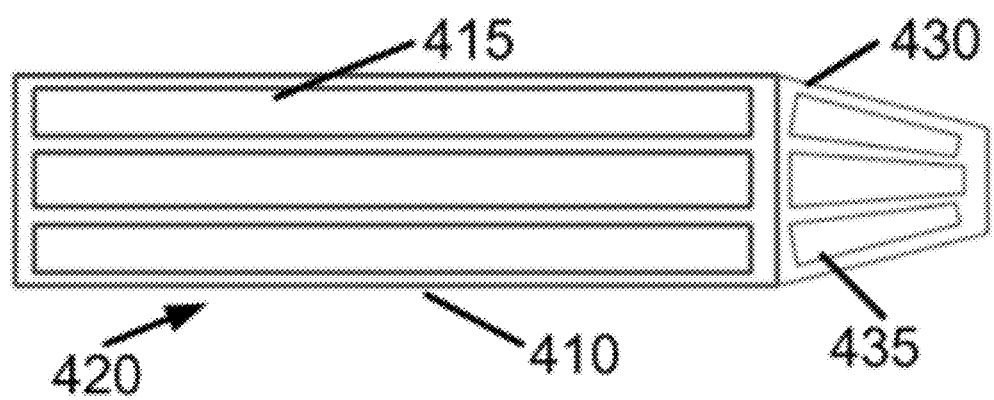
FIG. 10 is a depiction of still another alternative mortar application head constructed in accordance with still another alternative embodiment of the invention.

Finally, FIG. 10 shows a combination of an elongated portion of a spinner head 410 including rectangular orifices 415, and including a conical section top 430, employing one or more trapezoidal orifices 435, in accordance with yet another alternative embodiment of the invention. This embodiment of the inventions thus provides the benefits of the embodiments described in connection with FIG. 9, and further provides the benefits of the elongated embodiment described in connection with FIG. 8.

Figure 13:
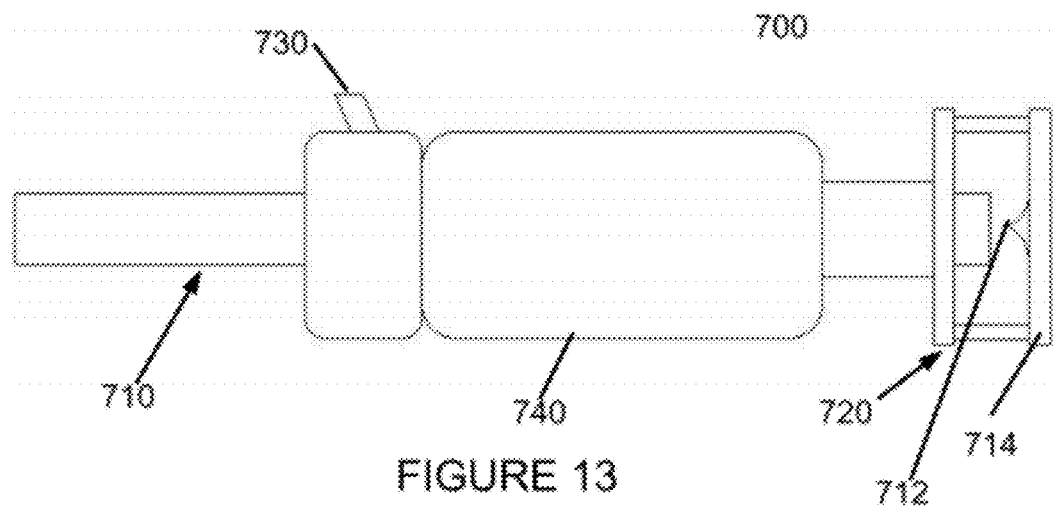
FIG. 13 is a conventional sprayer head.
Figure 14:
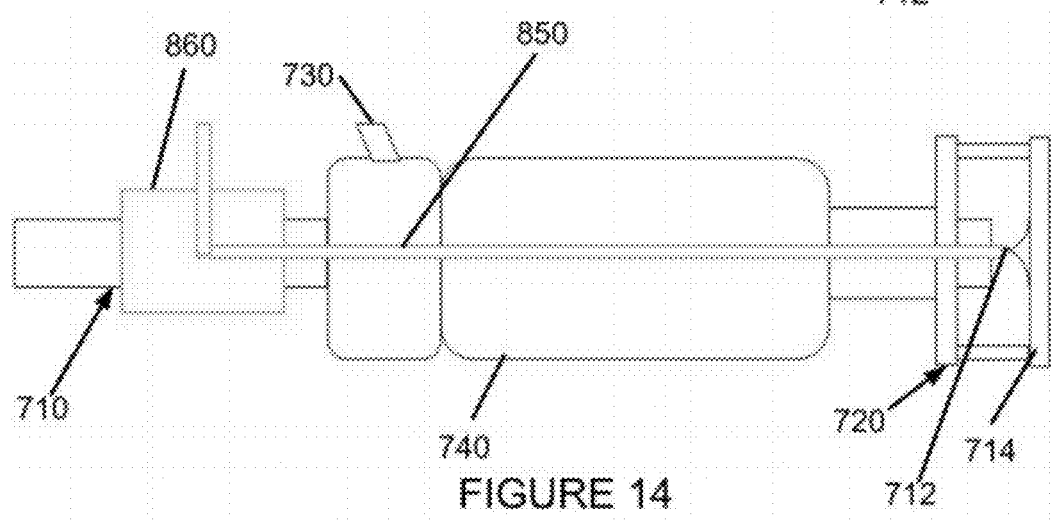
FIG. 14 depicts a sprayer head constructed in accordance with an alternative embodiment of the invention.

Any of these inventive or conventional spinner heads may be employed with one or more of the following embodiments of the invention, depicting various inventive mortar delivery systems. FIG. 14 presents a first of such inventive mortar delivery systems, and comprises a modification to the conventional spinner head assembly depicted in FIG. 13, and includes an additional intake line 850 being coupled to material delivery device 710 via a coupler 860 for delivery or air or any other desirable material to the spinner head via the mortar delivery system. Any of the spinner heads described above with respect to FIGS. 7-10 (or any conventional spinner head) may be employed in accordance with the embodiment of FIG. 14. Therefore, in accordance with this embodiment of the invention, an additional intake line is introduced to allow for the addition of further material to the material intake line via the coupler 860. The additional intake line is preferably placed at a radial center of material delivery device 710. Preferably, this additional intake line is open ended and may be terminated in a position in the vicinity of the spinner head, or the spinner disk, preferably just before reaching these portions of the apparatus, and further in the vicinity of the material discharge location 712. As described, any air and/or other material provided via the additional intake line 850 preferably exits out of the intake line in a manner that evenly spreads high pressure, high volume air and/or other material across the rear spinning discharge disk 714, and thus may be combined at that point with any mortar or other material being delivered via material delivery device (tube) 710. In accordance with this embodiment of the invention, the spinning disk may be modified in a manner so that it is adapted to receive the air and/or other material evenly and redirect the flow thereof along the inside face of the spinning discharge disk.

In accordance with this additional embodiment of the invention, one or more of the following benefits may be realized. First, various material discharge properties may be altered. In particular, material discharge volume may decrease, and oxidation of materials may increase. Air and/or any other desired materials may be introduced at the discharge point. Speed of the discharged material may increase, while the pattern of the discharged material may change. In particular, a larger number of smaller particles may be discharged, and these solid particles may be more evenly dispersed within a more definitive pattern. Next, material may be propelled by entering into a high velocity directed air stream, or stream of other desirable material, and will not simply be centrifugally discharged. Further, there may be less wear on the equipment during repeated use. The material will move in accordance with air or other material flow, resulting in reduced material to metal friction on the spinner head so that the spinner will operate more consistently and evenly while more air will be demanded by the spinner motor. In addition, it is contemplated that as a result, any seals employed by the spinner head will last longer. Finally, such an inventive apparatus will enable additional regulation of remediation material flow via a control mechanism not currently achievable using the more typical prior art systems.

Figure 15:
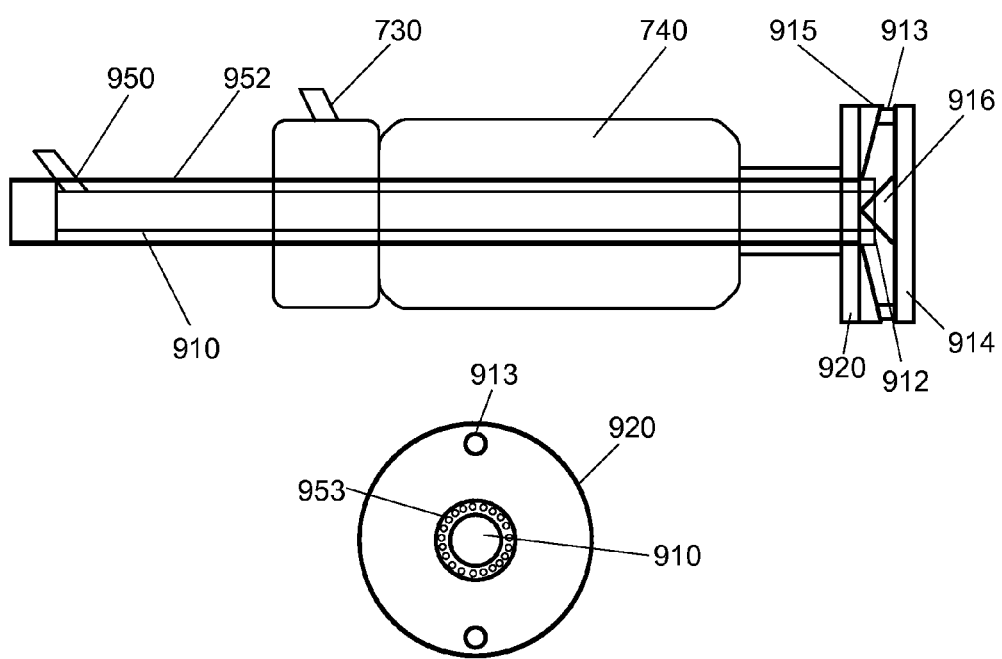
FIG. 15 depicts a sprayer head constructed in accordance with yet another embodiment of the invention.

Referring next to FIG. 15, a further alternative embodiment of the invention is shown, and includes delivery of air around the perimeter of the material supply pipe. Thus, as is shown in FIG. 15, this alternative embodiment includes an additional intake line 950 being coupled to material delivery device (pipe) 910. The original air intake 730 may be employed in order to propel the spinner head in a pneumatic matter. Any of the spinner heads described above with respect to FIGS. 7-10 (or any conventional spinner head) may be employed in accordance with the embodiment of FIG. 15. Therefore, in accordance with this embodiment of the invention, an additional air intake line is preferably introduced to allow for the addition of air to be supplied around the perimeter (coaxially) to material supply device 910. The additional air intake line 952 is thus preferably placed around, and substantially coaxially to, material delivery device 910. Preferably, this additional air intake line is open ended and may be terminated in a position in the vicinity of the spinner head, or the spinner disk 920, preferably just before reaching these portions of the apparatus, and further in the vicinity of the material discharge location 912. Spinner disk 920 is preferably formed with material supply device 910 passing therethrough, and air intake line terminating at air discharge ports 953 formed therein. Pins 913 are provided for positioning a rear spinning discharge disk 914 a desired distance from spinner disk 920. Rear spinning discharge disk 914 may be formed with a protrusion 916 for the direction of supplied material and air radially outward from the spinner head. An additional directional member 915 (circularly provided, but triangular in cross section) may be provided for further directing the supplied material and air. As described, any air and/or other material provided via the additional air intake line 952 preferably exits out of the intake line in a manner that evenly spreads high pressure, high volume air and/or other material across the rear spinning discharge disk 914. In accordance with this embodiment of the invention, the spinning disk may be modified in a manner so that it is adapted to receive the air and/or other material evenly and redirect the flow thereof along the inside face of the spinning discharge disk. Any number of intake lines 952 may be provided to allow for the supply of air or other materials.

The following additional benefits may be enjoyed in accordance with this embodiment of the present invention. The introduction of high volume high pressure air and/or other materials at a discharge point may be achieved. The material may be projected or propelled at a high velocity using an uninterrupted directional air stream. The high velocity material is preferably shot out in a manner which achieves a high velocity and impact achieving a greater physical packing or density. The propelled material preferably achieves high density which positively affects the mortar performance and durability. Benefits may result in mortar that is more resistant to chemical attacks, is more impervious and has improved compressive strength. Additionally, a greater diameter placement may be achieved while providing an improved consistency of final product.

Therefore, as is described in FIG. 15, an intake line is introduced into the material in flow fitting, and is preferably placed around the perimeter of the material intake line, and coaxially thereto. The intake line preferably terminates just before the end spinner head or spinner disk and discharges a high velocity of pressured air through $3/16"+$ or $-1/8"$ diameter orifices, although any sized orifices may be employed.

As a result, the air and/or other material exits out of the intake line in a manner which evenly spreads high pressure high volume air and/or other material across the rear spinning discharge disk. The spinning disk discharge is preferably constructed in a manner which receives the air and/or other material evenly and redirects the flow along the inside face of the spinning discharge disk, through the use of protrusion 916 and directional member 915. The air and/or other material is sprayed out in a 360 degree pattern (or other pattern as desired) at high speed and pressure. Mortar is pumped through the center material intake line 910 and is pushed into this air stream. The mortar is combined with the air and/or other additives, introduced in accordance with one or more intakes 950, or through a single intake 950.

Furthermore, material discharge properties will be altered in that material discharge volume will decrease while oxidation of materials will increase. Air and/or other materials will be introduced at the discharge point. The speed of the thrown material will increase while the pattern of the material thrown will change: a larger number of smaller solid particles will be shot or propelled while solid particles will be more evenly dispersed within a more definitive pattern. Material will be propelled by entering into a high velocity directed air stream and not just physically flung centrifugally. As a result, there will be less wear on the equipment, material will move on air, resulting in reduced material to metal friction on the spinner head. The spinner will run more consistently and evenly, air demand by a system motor will be more even, and seals will last longer. This improved inventive apparatus will enable an additional regulation or control mechanism not currently available.

In accordance with an alternative embodiment of the invention, and as described above, any of the described inventive mortar delivery systems may be coupled with one or more of the described inventive sleds to be used as the foundation mount and transport vehicle for any type of inventive spinner or spray nozzle. The sled may further act as the foundation or mount of the described mixture and delivery system. Therefore, in accordance with the invention, such a sled may be provided that smoothly moves through a pipe or other confined space so that the spinner head preferably travels along a substantially level path. The sled may pass through the pipe at any portion of the diameter thereof, the sled may preferably pass at substantially the center most point of a pipe or cavity, through the user of various positioning elements, as described above. An air activated or hydraulically activated set of tracks that may be controlled by the volume of mortar material being sprayed is preferably employed for maintaining a location and positioning of the sled. Furthermore, the above-described method in which the spinner head may oscillate forward and backward at even intervals and distance along a horizontal plain creating an oscillating spray point allowing the buildup of material to the greatest thickness in a single pass may be employed. A reciprocating arm may be provided that moves the spinner head forward and backward along a cylinder, the cylinder preferably supplying the mortar to the spinner (see FIGS. 2-6). Thus as is shown in FIG. 3, for example, in this particular embodiment, one or more linkage arms 330 may be coupled to a point other than a central point of a cylinder 335, thus imparting a reciprocating motion to the linkage arms 330. This reciprocating motion is preferably transferred to the spray head resulting the described oscillating motion. Of course any method of oscillating the spray head may be employed. This movement preferably allows for a stroke or distance of any desired amount, and preferably from a minimum of 3" to a max of 48" stroke or distance. In alternative embodiments of the invention, movement of the spinner head in a reciprocating axial direction allows for the application of multiple layers of material during one application, thus aiding in generating a thickness of rehabilitation material as desired. Use of such an oscillating spray head may allow for the buildup of materials in layers, providing a laminating effect. Benefits of this oscillating spray head motion may include an even oxidation of materials throughout the entire applied mass of material, an ability to build up a greater thickness of material while providing greater control over the applied thickness of the materials as well as greater control over the distribution of the materials. Such an oscillating spray head further allows for an even distribution of additives through the mass of applied materials and finally may compensate for any irregularity in the movement of the sled.

A mixture and delivery system allows a liquid admixture to be sprayed into the material stream, the combined material then being sprayed from the spinner head. Thus, as such rehabilitation material is output from the spinner head, liquid or other material may be added to the material stream.

Additional embodiments of the invention may employ the above described mixer for mixing material in a confined space or pipe, such as within or adjacent to the remediation area, thus allowing for the combining of dry powder and liquid, etc. in order to provide a desired mixture of rehabilitation material. A feeder may also be provided to receive, store, and feed material to an inline mixer. It may be considered the engine or locomotive used to move the whole train of equipment through the lines, and may comprise a control center of the apparatus. A harness, as described above, may be provided, connecting and delivering all components together, and may preferably supply air, water, power, and raw dry material to the equipment.

Mortar Wet Delivery Process

Figure 16:
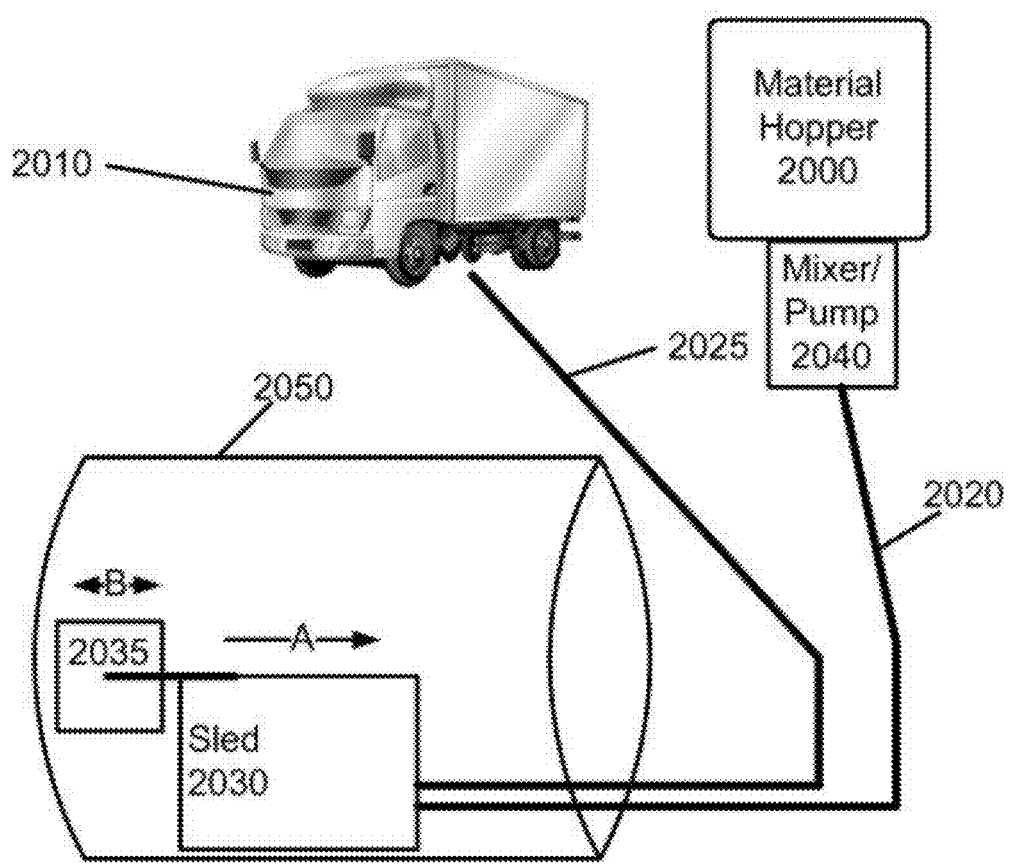
FIG. 16 is a block diagram of an inventive mortar wet delivery application process in accordance with an embodiment of the invention.

In accordance with an alternative embodiment of the invention, a wet delivery process for mortar application may be employed. Referring first to FIG. 16, a system for performing the inventive wet delivery of mortar for application is shown. Dry powder and other material required for application of rehabilitation material is preferably stored in a material hopper 2000. While only one material hopper is displayed, it should be understood that multiple material hoppers or other holding mechanisms may be employed to hold larger amounts, or to hold different materials that are not yet to be mixed together. Also shown in a support truck 2010 (or other support mechanism, i.e. train, etc.). The support truck preferably provides cranes and other mechanical assistance as may be necessary, and further (as will be described below) operates a harness employed to properly position a spraying mechanism. As noted, any type of support mechanism may be employed that provides sufficient mechanical and other support (electrical, etc.).

As is further shown in FIG. 16, material hopper 2000 is coupled with a mixer/pump 2040 for mixing the dry power supplied in hopper 2000 with water and other materials as desired. Mixer/pump 2040 may be coupled to material supply line 2020 for providing material from material hopper 2000 to a sled 2030. Support truck 2010 is preferably further coupled to a harness 2025, preferably including at least a means for moving sled 2030, such as a chain, cable or the like. Sled 2030 is preferably placed within a remediation area, such as a pipe 2050 or the like.

In accordance with various embodiments of the invention, powder, such as a dry remediation material, may be delivered to the jobsite in small 25 lb to 100 lb breakable bags, 500 lb to 3000 b bulk super sacks, or in bulk pneumatic tankers, or other appropriate delivery vessel. A "spinner" or spray head may be located at or near a beginning discharge point of a surface to be rehabilitated. A particular inventive spinner to be employed with this mortar wet delivery process will be described below. Similar to the embodiment depicted in FIG. 1, a "sled" or spraying equipment may be transported into a pipe or confined space cavity. The spinner is preferably attached to the sled. Remediation material is preferably discharged into a pump capable of pumping the thick slurry mortar through a line (Part of the harness) which is attached to the spinner head. The harness is preferably attached to the remaining apparatuses, and preferably delivers one or more of the following: electric, water, air, dry mortar, wet mortar, hydraulic to the sled and spinner head. The air and mortar (and any other supplied materials) are preferably combined at the point of spray generating an air sprayed material.

Material preferably employed in such an implementation may include a large volume air compressor with a preferable minimum output of 100 C.F.M, or other desirable output, a large generator capable of minimum 220 v output, or other desirable output, and a water storage tank and pump capable of supplying adequate water for pre-washing of application area and batch water for material. Preferably Minimum 500 gallon, or other desired amount. One or more material storage bins or hoppers with attached blowers capable of receiving and pneumatically delivering the dry bulk material to the feeder may also be employed. A mortar mixer, concrete pump, and a crane or winch capable of lifting equipment in and out of confined space as well as loading and unloading bag and super sack raw materials may also be employed In accordance with such an embodiment of the invention, a new material spinner head design may be employed, avoiding the need for a motor or other spinning device for the application of wet remediation material. In such a novel spinner head, remediation material may be combined with air or high pressure air which accelerates or shoots the material at a high velocity. Such high pressure air and remediation material mixture may turn a turbine or fin configuration spinner head, thus creating a spinning motion. The spinning motion preferably turns key discharge points. (Similar to a sprinkler head which uses the water pressure to spin the head). The high pressure material with high pressure air preferably work together to both spin the head and spray the material with a high pressure and material impact.

Figure 11:
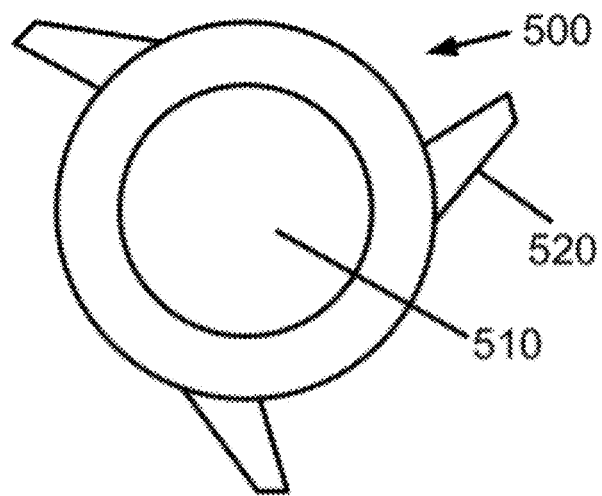
FIG. 11 is a depiction of a sprayer head constructed in accordance with an embodiment of the invention.
Figure 12:
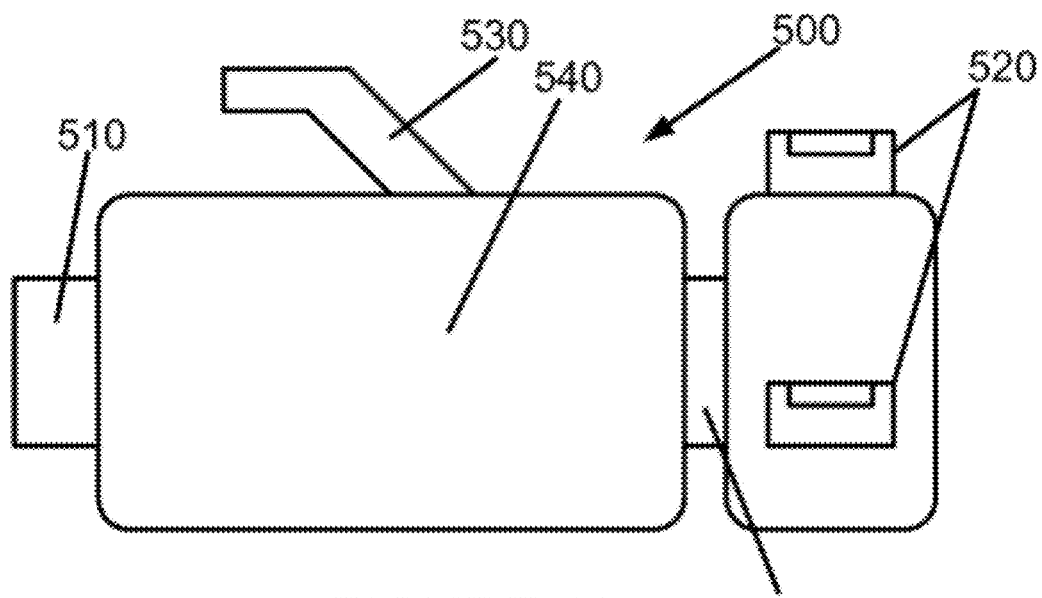
FIG. 12 is a front plan view of the sprayer head of FIG. 11.

Such an inventive nozzle is shown in FIGS. 11 and 12. As is shown in FIG. 11, a nozzle 500 spins about an axis 510, comprising a hose of other material delivery device. Upon delivery of material at a high speed, such material is preferably ejected at a high velocity from one or more angled ejection ports 520, the direction of these ports moving nozzle 500 about axis 510 upon the ejection of such material. Thus, through the ejection of such material through these angled ejection ports, a rotational motion is applied to the spinner head, in addition to ejecting the material. The combined material therefore generates rotational motion of the spinner head while also applying the combined material as desired. Such a nozzle may be employed with any of the orifice designs described above. FIG. 12 further depicts an injection tube 530 for allowing the injection of any desired material, and a mixing chamber 540 for mixing material from hose 510 and injection tube 530.

Therefore, in accordance with various embodiments of the invention, apparatuses and methods are provided allowing for a uniform, thick mixture of remediation material to be provided to a surface to be remediated, such as the internal surface of a pipe or other surface or space.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. An apparatus for applying mortar, comprising:
   a support sled having a support frame with an upper support frame, a lower support frame, and a height adjustment element to position the upper support frame relative to the lower support frame;
   a mixer positioned on the support sled, the mixer combining a dry powder mortar received from a harness for moving the apparatus in a desired direction of travel, and one or more of a liquid or air received from the harness;
   a pump positioned on the support sled and adapted to pump the mixed mortar; and
   a spray head positioned on the support sled and adapted to receive the pumped mortar mixture and spray the mixture, the spray head including trapezoidal orifices.

2. The apparatus of claim 1, further comprising an air input for inputting air to the spray head to pneumatically spin the spray head.

3. The apparatus of claim 1, wherein the apparatus is adapted to be driven in a direction substantially perpendicular to the direction of spray of the mixture.

4. The apparatus of claim 1, wherein the mixture is sprayed on the inside of a pipe.

5. The apparatus of claim 1, further comprising a liquid delivery conduit for providing liquid to the mixer.

6. The apparatus of claim 1, further comprising a mortar delivery conduit for providing mortar to the mixer.

7. The apparatus of claim 1, wherein the direction of travel is substantially coaxial to a pipe in which the apparatus is positioned, and the harness provides one or more of air, water, power or dry material.

8. The apparatus of claim 1, wherein the support sled is adapted to be broken down to be passed to a difficult to reach remediation location, and reassembled again once in the remediation location.

9. The apparatus of claim 1, wherein the support sled is adjustable in the vertical direction to change a height of the spray head.

10. An apparatus for applying mortar, comprising:
    a support sled, the support sled being height adjustable and having a support frame with an upper support frame, a lower support frame, and a height adjustment element to position the upper support frame relative to the lower support frame;

a harness for moving the apparatus in a desired direction of travel, the harness supplying one or more of air, water, power and dry material;

a mixer positioned on the support sled, the mixer combining a received dry powder mortar from the harness and water from the harness;

a pump positioned on the support sled and adapted to pump the mixed mortar; and a spray head positioned on the support sled and adapted to receive the pumped mortar mixture and spray the mixture, the spray head having trapezoidal orifices.

11. The apparatus of claim 10, wherein the spray is sprayed on the inside of a pipe.

12. The apparatus of claim 10, further comprising a liquid delivery conduit for providing the water to the mixer.

13. The apparatus of claim 10, further comprising a mortar delivery conduit for providing mortar to the mixer.

14. The apparatus of claim 10, further comprising a plurality of skis for supporting the support sled.

15. The apparatus of claim 10, further comprising a plurality of wheels for supporting the support sled.

16. The apparatus of claim 1, wherein the trapezoidal orifices are elongated.

17. The apparatus of claim 1, wherein the spray head includes a portion having rectangular orifices and a conical portion having the trapezoidal orifices.

18. The apparatus of claim 17, wherein the portion having rectangular orifices is elongated.

19. The apparatus of claim 10, wherein the trapezoidal orifices are elongated.

20. The apparatus of claim 1, wherein the spray head includes a portion having rectangular orifices and a conical portion having the trapezoidal orifices.

* * * * *